US00RE36870E

United States Patent [19]

Isshiki et al.

[11] E Patent Number: Re. 36,870

[45] Reissued Date of Patent: Sep. 12, 2000

[54] CORD AND FABRIC FOR A POWER TRANSMISSION BELT

[75] Inventors: Shigehiro Isshiki; Masami Sato; Yasuyuki Tatsumi; Yutaka Yoshimi, all of Yamatokoriyama, Japan

[73] Assignee: Unittta Company, Osaka, Japan

[21] Appl. No.: 08/892,890

[22] Filed: Jul. 15, 1997

Related U.S. Patent Documents

Reissue of:

[64] Patent No.: 5,501,643
Issued: Mar. 26, 1996
Appl. No.: 08/341,156
Filed: Nov. 16, 1994

[30] Foreign Application Priority Data

Nov. 19, 1993 [JP] Japan ..... 5-314284
Oct. 21, 1994 [JP] Japan ..... 6-282652

[51] Int. Cl.[7] ..... F16G 1/08; D02G 3/00; B32B 9/00

[52] U.S. Cl. ..... 474/268; 474/237; 428/378; 428/392; 525/105

[58] Field of Search ..... 474/205, 237, 474/263, 264, 265, 266, 267, 268; 428/375, 377, 378, 392, 394, 395, 902; 442/169, 180

[56] References Cited

U.S. PATENT DOCUMENTS

| | | | |
|---|---|---|---|
| 4,421,891 | 12/1983 | Miyake et al. | 524/495 |
| 4,643,938 | 2/1987 | Oyama et al. | 428/268 |
| 4,910,267 | 3/1990 | Oyama et al. | 525/352 |
| 4,963,621 | 10/1990 | Szentivanyi et al. | 525/207 |
| 5,006,603 | 4/1991 | Takaki et al. | 525/105 |
| 5,034,469 | 7/1991 | Buding et al. | 525/338 |
| 5,049,610 | 9/1991 | Takaki et al. | 524/514 |
| 5,051,299 | 9/1991 | Brown | 428/221 |
| 5,209,961 | 5/1993 | Yokoi | 428/161 |
| 5,234,387 | 8/1993 | Fujiwara et al. | 474/205 |
| 5,250,010 | 10/1993 | Mishima et al. | 474/263 |
| 5,306,213 | 4/1994 | Nakajima et al. | 474/263 X |
| 5,310,386 | 5/1994 | Mizuno et al. | 474/205 |
| 5,378,206 | 1/1995 | Mizuno et al. | 474/263 |
| 5,417,618 | 5/1995 | Osako et al. | 474/205 |

FOREIGN PATENT DOCUMENTS

| | | |
|---|---|---|
| 1059588A | 3/1992 | China . |
| 3248378 | 7/1983 | Germany . |
| 3330844 | 3/1984 | Germany . |
| 4001606 | 7/1991 | Germany . |
| 4125209 | 2/1993 | Germany . |
| 4135355 | 4/1993 | Germany . |
| 4234149 | 4/1993 | Germany . |
| 4413540 | 10/1994 | Germany . |
| 63-270753 | 11/1988 | Japan . |

*Primary Examiner*—Rodney H. Bonck
*Assistant Examiner*—Matthew A. Kaness
*Attorney, Agent, or Firm*—Liniak, Berenato, Longacre & White

[57] ABSTRACT

A *cord and fabric for a* power transmission belt comprised of a belt body having a tooth portion and made of a rubber stock of hydrogenated nitrile having a Mooney viscosity at 100° C. of at least 90, whereby the internally generated heat of the belt body during use in a high temperature environment is suppressed. A cashew-modified phenol resin layer is formed at the outermost layer of the cords *and fabric* for bonding with the belt body. The cords are embedded in the longitudinal direction of the belt body.

36 Claims, 4 Drawing Sheets

CORD AND FABRIC FOR A POWER TRANSMISSION BELT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to *a cord and fabric for* a power transmission belt for transmitting rotational force, for example, between an engine output shaft and an air-conditioner, alternator, etc. in an automobile.

2. Description of the Related Art

A conventional power transmission belt is comprised for example of a belt body, on one side of which is formed a tooth portion, and cords embedded in the belt body.

In recent years, along with the improvements in engine performance, the rotational speed of the crankshafts has been rising. Further, larger loads have been generated due to use of the power for driving further auxiliary machinery. Therefore, the temperatures around where the power transmission belts are mounted have been becoming much higher.

Further, in applications for high performance engines, the rubber stock used for belt bodies has in recent years been changing from chloroprene rubber to hydrogenated nitrile rubber. Hydrogenated nitrile rubber is reputed to be superior in heat resistance, but when the rubber is subjected to repeated expansion and contraction at high speeds, the heat generated in the rubber itself (hereinafter referred to as the "internally generated heat") itself becomes large.

Due to the excessive heat, it has been difficult to produce drive transmission belts meeting engine requirements.

To solve this problem, it is necessary that the rubber itself have a strong resistance to heat deterioration. That is, the internally generated heat of the rubber should be small when the power transmission belt is driven at a high speed in a high temperature environment. Japanese Unexamined Patent Publication No. 63-270753 etc. disclose a technique of cross-linking hydrogenated nitrile rubber by zinc methacrylate and other metal salts of ethylenic unsaturated carboxylic acids and dicumyl peroxide or other peroxides so as to make it superior in heat resistance and give it rigidity along with elasticity, but this technique cannot be said to be sufficient.

Further, the service life of a power transmission belt is not dependent solely on the heat resistance of the rubber stock used for the belt body but is closely related with the material of the rubber stock and cords, the bonding strength of the two etc. These interact with each other.

SUMMARY OF THE INVENTION

The present invention was made to solve the above problems and has as its object the provision of a power transmission belt with a long service life wherein the internally generated heat of the belt body is kept low even under high speed use and the bonding strength of the rubber stock and cords is sufficiently high so there is little breaking off of teeth.

The power transmission belt according to the present invention is comprised of a belt body formed using as a rubber stock a hydrogenated nitrile rubber having a Mooney viscosity of at least 90 at 100° C. and cords embedded in the belt body extending in the longitudinal direction of the belt body and having at their outermost layer a layer of phenol resin modified by phenol having side chains with unsaturated bonds and a component including a phenolcarboxylic acid and a predetermined compound.

A cashew-modified phenol resin has properties of both a portion with polarity at the aromatic hydroxyl groups and a portion with no polarity at side chains of carbon atoms, that is, portions which have polarity and do not have polarity. Accordingly, it is possible to strongly bond by peroxide vulcanization the outermost layer of the overcoat layer with a large polarity covering the cords constituting part of the power transmission belt and a high molecular weight hydrogenated nitrile rubber with a small polarity constituting part of the power transmission belt. In the same way, depending on the cashew-modified phenol resin, it is possible to strongly bond the surface of a fabric treated to have polarity and a high molecular weight hydrogenated nitrile rubber.

DESCRIPTION OF THE PREFERRED EMBODIMENTS

The present invention will be explained in accordance with the embodiments illustrated below.

Figure 1:
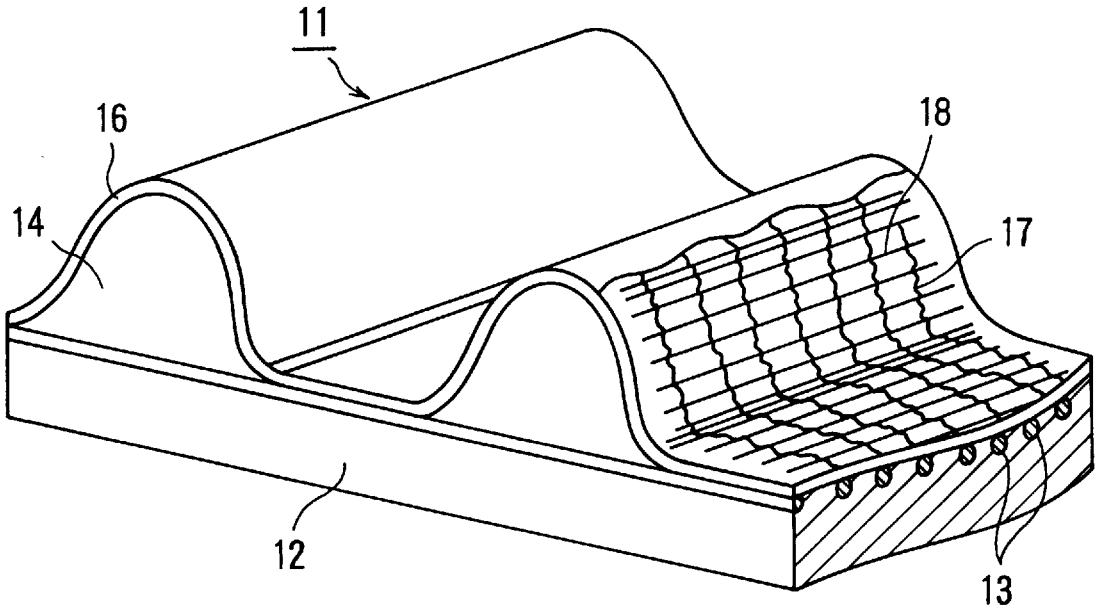
FIG. 1 is a perspective view of a power transmission belt according to a first embodiment of the present invention.

FIG. 1 is a partially cutaway perspective view of the power transmission belt 11 of one embodiment of the present invention. The tooth portion 14 is formed on one surface of the belt body 12. On the pitch line of the belt body 12, cords 13 with an S-twist secondary twist and cords 13 with a Z-twist secondary twist are embedded in parallel (however, in FIG. 1, no distinction is made between the S-twist and the Z-twist). The surface of the tooth portion 14 is covered by the fabric 16.

Figure 2:
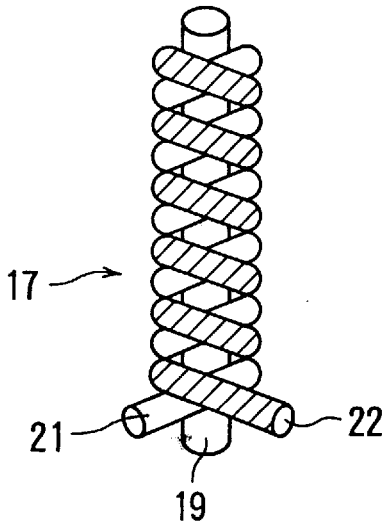
FIG. 2 is an enlarged view of a warp of the fabric.

The fabric 16 is obtained by twill weaving a stretchable warp 17, which later is laid along the longitudinal direction of the belt and a nonstretchable Weft 18, which later is laid along the width direction of the belt. Note that the definition of the warp and weft in the belt structure is not necessarily the same as the definition of the warp and weft in fabric-making. As shown in FIG. 2, the warp 17 is a composite yarn comprised of a core yarn 19 around which is wound a spun yarn 21 around which in turn is wound a crimping yarn 22.

In the present invention, ethylenic unsaturated nitrile-conjugated diene high saturation copolymer rubber (hereinafter referred to as "nitrile rubber") is used for the rubber stock of the belt body 12. Ethylenic unsaturated nitrile is a compound obtained by addition of a nitrile group (—CN) to one end of the adjoining carbon atoms having an ethylenic unsaturated bond and includes acrylonitrile etc. Further, a conjugated diene is a compound with two adjoining double bonds and includes butadiene, isoprene, etc.

In the nitrile rubber used for the power transmission belt of the present invention, hydrogenation is performed on the unsaturated bonds between the carbon atoms. In general, the heat aging resistance of rubber is improved with a rate of hydrogenation of the unsaturated bonds between carbon atoms in the nitrile rubber of at least 80 percent. At the present time, this rate is raised to as high as 99 percent. The rate of hydrogenation of the hydrogenated nitrile rubber used for the power transmission belt of the present invention is preferably from 80 to 99 percent.

The hydrogenated nitrile rubber used for the power transmission belt of the present invention has a higher molecular weight than the conventional hydrogenated nitrile rubber. The magnitude of the molecular weight is indicated by the Mooney viscosity. The Mooney viscosity at a measurement temperature of 100° C. is about 85 in the case of conventional hydrogenated nitrile rubber, but at least 90 and preferably about 145 in the case of the hydrogenated nitrile rubber of the present invention. Note that in this specification, a hydrogenated nitrile rubber with a Mooney viscosity of over 90 at 100° C. is referred to as a "high molecular weight type hydrogenated nitrile rubber".

In the present invention, the high molecular weight type hydrogenated nitrile rubber may be vulcanized. The method of vulcanization is not particularly limited, but for example may be vulcanization by an organic peroxide or sulfur. It is possible to use only one organic peroxide, but preferably use is made of two or more in combination. The organic peroxides are used in an amount of 0.2 to 100 parts by weight with respect to 100 parts by weight of the rubber. If necessary, use may be further made of zinc methacrylate, zinc oxide, or other covulcanizing agents and vulcanizing accelerators. In particular, if used is made of trimethylolpropane trimethacrylate as a covulcanizing agent, there are the effects that the impact resilence is improved, the compression strain is kept low, etc.

The cords 13 are not particularly limited, but use is preferably made of cords of high strength glass fiber or aromatic polyamide fiber. To increase the bonding strength between the cords 13 and the belt body 12, a resorcine formaldehyde latex (RFL) layer may be formed on the cords 13 and then the cords passed through a rubber solution comprised of a rubber component similar or identical in properties to the latex rubber component so as to form an overcoat layer with superior bonding ability with the RFL layer.

In the present invention, a modified phenol resin layer is formed on the outermost layer of the cords 13. The modified phenol resin layer is preferably comprised of a cashew-modified phenol resin.

The inventors found through experiments that it was not possible to bond cords 13 having an overcoat layer which could be bonded with a normal type of hydrogenated nitrile rubber with a high molecular weight type hydrogenated nitrile rubber without modification. They were not able to succeed even after repeated experiments. Even when deciding to use a cashew-modified phenol, they first tried mixing it with the rubber or adding it to the overcoat agent or mixing and adding the same to the two, but were not able to achieve bonding. The effect was the same even when adding it to the RFL layer, i.e., bonding was not possible. They finally learned that the cords 13 and rubber of the belt body 12 could be bonded by forming a cashew-modified phenolic reins layer at the outermost layer of the cords 13.

The strong bonding ability of the cords 13 and the rubber of the belt body 12 when a cashew-modified phenol resin layer is formed at the outermost layer of the cords 13 is believed to be because of the effective action of the high polarity of the cashew oil (cashew nut shell liquid) with aromatic hydroxyl groups and the side chains of the modified phenol component, which are comprised of a long 15 carbon atoms and have unsaturated double bonds.

Three compounds are known to be included as main ingredients in cashew oil. Each of these compounds are comprised of phenolic hydroxyl groups with large polarities bonded to aromatic rings of six carbon atoms and of side chains comprised of 15 carbon atoms bonded to the aromatic rings, having double bonds, and small in polarity.

The chlorosulfonated polyethylene of the rubber component of the overcoat layer has a large polarity due to the inclusion of chlorine, while the hydrogenated nitrile rubber is believed to be small in polarity since it does not include large polarity chlorine and is high in molecular weight.

Even by simplying interposing phenol between the large polarity overcoat layer and the small polarity high molecular weight hydrogenated nitrile rubber layer and then heating and pressurizing, no change is observed in respect to bonding of the two. As opposed to this, in the present invention, it is possible to strongly bond the overcoat layer and the rubber of the belt body 12 by interposing a cashew-modified phenol layer between the two when forming the belt. It is believed that a strong bond is obtained since the small polarity side chains of the cashew-modified phenol resin have affinity with the small polarity rubber of the belt body 12 and since the large polarity phenol portion has affinity with the large polarity overcoat layer. The rubber component of the overcoat layer may be, in addition to the above, chlorinated polyethylene containing chlorine of a homologue, alkylchlorosulfonated polyethylene, and other rubber components.

On the other hand, at the locations where the high molecular weight type hydrogenated nitrile rubber layer constituting the belt body 12 and the cashew-modified phenol come in contact, the peroxide vulcanization of the rubber compound causes cross-linking between the hydrogenated nitrile rubber and the cashew-modified phenol side chains.

In the present invention, the cords 13 are immersed in a methylethylketone solution of cashew-modified phenol, so when dried, a film is formed on the outermost layer of the cords. The contact of the hydrogenated nitrile rubber with the cashew-modified phenol forms conditions facilitating the cross-linking reaction. This point is important.

The inventors were not able to achieve bonding when directly adding the cashew-modified phenol to the hydrogenated nitrile rubber rubber by normal means or when directly adding it to the overcoat layer. This is believed to be because when directly adding it, the concentration of the cashew-modified phenol at the interface required for the bonding becomes low. In other words, hydrogenated nitrile rubber and RFL could not be bonded at normally considered concentrations.

The modified phenol resin layer may be comprised of a phenol modified by a naturally produced component containing a phenol component with side chains. As the modified phenol, mention may be made of Japanese lacquer-modified phenol, Tsuta lacquer-modified phenol, Indochina lacquer-modified phenol, Taitung lacquer-modified phenol, Burmese lacquer-modified phenol, Cambodian lacquer-modified phenol, cashew-modified phenol, and bhilawan shell liquid-modified phenol.

The modified phenol resin layer may also be comprised of a phenol resin modified by naturally produced phenol components having side chains. As the phenol modified by naturally produced phenol components, mention may be made of cardol-modified phenol, cardanol-modified phenol, urushiol-modified phenol, laccol-modified phenol, thitsiol-modified phenol, moreacol-modified phenol, and bhilawanol-modified phenol.

The modified phenol resin layer may also be comprised of a phenol resin modified by natural phenol carboxylic acids with side chains or components containing phenol carboxylic acids.

The modified phenol resin layer may be comprised of the natural phenol carboxylic acid of alcardic acid modified phenol resin.

The modified phenol resin layer may also be comprised of a cashew-modified phenol resin layer containing the natural phenol carboxylic acid of [alcardic] *anacardic* acid.

The modified phenol resin layer may also be comprised of a phenol resin modified by a phenol with side chains introduced in the phenol.

The modified phenol resin layer may also be comprised of a phenol resin modified by a reaction product of phenol and oiticica oil or a phenol resin modified by an addition reaction product of catechol and tung oil.

The modified phenol resin layer may also be comprised of a resin comprised of phenol modified by a component in which an aromatic ring having a phenolic hydroxyl group is introduced into a side chain comprised of a plurality of carbon atoms. Further, the side chain portion may include double bonds.

The surface of the tooth portion 14 may be covered by a fabric if necessary. This fabric 16 is comprised for example of a twill weave of a composite yarn laid along the longitudinal direction of the belt and a filament yarn laid along the width direction of the belt. The composition of the yarns and the method of weaving of the fabric 16, however, are not limited to these. For example, the method of weaving may in accordance with certain objectives be made a sateen weave, plain weave, and various other modified weaves.

The composite yarn of the fabric 16 is for example comprised of a core yarn 19 of polyurethane, an elastic yarn, a spun yarn 21 wrapped around the core yarn 19, and a crimping yarn wrapped around the outside of the spun yarn 19. Further, while it is preferable to use a polyurethane elastic yarn for the core yarn 19, an aromatic polyamide fiber superior in heat resistance for the spun yarn 21, and an aliphatic synthetic fiber of nylon yarn, polyester fiber, etc. with a relatively low softening temperature and superior in wear resistance for the crimping yarn, the invention is not limited to these.

The yarn 18 of the width direction of the belt is preferably a yarn superior in nonstretchability, rigidity, and heat resistance. For example, a filament yarn of nylon fiber is suitable.

When using the conventional hydrogenated nitrile rubber for the belt body 12, RFL processing was performed using an RFL solution comprising carboxyl nitrile rubber as a latex component to bond the fabric 16 and belt body 12.

The inventors found by experiments that when using a high molecular weight type hydrogenated nitrile rubber as the rubber for the belt, it was not possible to bond the fabric 16 and the rubber of the belt body 12 by the above method of processing. They made various attempts to use cashew-modified phenol, but at first were not able to effectively strongly bond the two even by mixing it with the high molecular weight type hydrogenated nitrile rubber or adding it to the treatment agent of the fabric 16. They learned that the two could be strongly bonded by forming a cashew-modified phenol resin layer at the outermost layer of the fabric [13] *16*.

The above-mentioned cashew-modified phenol resin layer formed on the fabric 16 may also be comprised of a Japanese lacquer-modified phenol resin.

As the resin constituting the modified phenol resin layer formed on the fabric 16, it is possible to use instead of the cashew-modified phenol resin, a phenol modified by urushiol, the main component of Japanese lacquer, etc. as with the case of the cords 13.

Further, the modified phenol resin may be a resin comprised of phenol modified by a component having side chains comprised of a plurality of carbon atoms introduced at the aromatic rings having phenolic hydroxyl groups. The side chain portions may contain double bonds. In the present invention, the treated fabric [15] *16* and hydrogenated nitrile rubber are able to be strongly bonded by interposition of the cashew-modified phenol. The reason is believed to be that use was made of a nitrile rubber latex having carboxyl groups as molecular ends for the L component of the RFL and that, when necessary, a chloroprene derivative having a polarity was added to treat the surface of the fabric 16 and give a large polarity, thereby ensuring affinity of the large polarity cashew-modified phenol portion with the surface of the fabric 16.

Note that when the cords 13 were treated with RFL, the resultant flexural performance and water resistance were both poor and it was not possible to obtain a power transmission belt with a long service life. This is believed to be due to the poor affinity between the latex rubber component and the rubber component of the overcoat due to their being different. Further, it was not possible to obtain a power transmission belt with a long service life either when the RFL used for the treatment of the cords 13 was applied to the fabric 16.

The present invention will be explained below with reference to examples and comparative examples, but is not limited to these in any way.

EXAMPLE 1

The rubber compounds A to D shown in Table 1 were formulated. Table 1 shows the rubber stock and the vulcanizing agents, vulcanizing accelerators, covulcanizing agents, and other materials mixed with the rubber stock and their parts by weight. Unless otherwise indicated, the figures show parts by weight of the materials with respect to 100 parts by weight of the rubber stock.

TABLE 1

| | Components of Rubber Stock | | | |
|---|---|---|---|---|
| | Rubber compound A | Rubber compound B | Rubber compound C | Rubber compound D |
| ZP 2010H (1) | 100 | 100 | — | — |
| ZP 2010 (2) | — | — | 100 | — |
| ZP 2000 (3) | — | — | — | 100 |
| Stearic acid | 1 | 1 | 1 | 1 |
| Zinc oxide | 10 | 10 | 10 | 10 |
| Naugard 445 (4) | 1.5 | 1.5 | 1.5 | 1.0 |
| Shoe black SRF | 20 | 40 | 40 | 60 |
| Zinc methacrylate | 25 | 15 | 15 | — |
| 40C (5) + F40 (6) | 18 | 18 | 18 | 7.5 |

TABLE 1-continued

| | Components of Rubber Stock | | | |
|---|---|---|---|---|
| | Rubber compound A | Rubber compound B | Rubber compound C | Rubber compound D |
| TMP (7) | 6 | 6 | 6 | 6 |
| Goodrich flexo test Measurement of internally generated heat | | | | |
| 23 lb load | 10.3° C. | 11.8° C. | 15.9° C. | 26.2° C. |
| 50 lb load | 13.7° C. | 16.5° C. | 19.9° C. | *** |
| Measurement of permanent set | | | | |
| 23 lb load | 0.8% | 0.8% | 1.8% | 9.3% |
| 50 lb load | 1.8% | 2.3% | 3.0% | *** |

Notes:
(1) High molecular weight type ethylenic unsaturated nitrile-conjugated diene high saturation polymer rubber (saturation rate of 96%), Nippon Zeon.
(2) Ordinary type ethylenic unsaturated nitrile-conjugated diene high saturation polymer rubber (saturation rate of 96%), Nippon Zeon.
(3) Ordinary type ethylenic unsaturated nitrile-conjugated diene high saturation polymer rubber (saturation rate of 99%), Nippon Zeon.
(4) 4,4'-(α,α-dimethylbenzyl)diphenylamine. Uniroyal.
(5) Dienmylperoxide, Dicup 40C, Hercules Co., organic peroxide type vulcanizing agent.
(6) 1.3-bis(t-butylperoxy-m-isopropylbenzene, Veroxymon F40, Nippon Oil and Fats, organic peroxide type vulcanizing agent.
(7) Trimethylolpropane trimethacrylate, Sunester TMP, Sanshin Kagaku.
(8) "-" no content, "***" not yet measured.

A comparison was made of the internally generated heat of the rubber compounds A to D. The comparison was performed by the Goodrich flexo test (ASTM D623-62 Standard Methods of Test for Compression Fatigue of Vulcanized Rubber).

The compounds were vulcanized under pressure, then were measured under conditions of 100° C. temperature, 1800 strokes/test, and a stroke of 0.121 inch (3.07 mm). The test specimens were cylindrical in shape having a height of 0.77 inch (19.6 mm). The rise in temperature of the test specimens was measured using a thermocouple. The test was performed with loads of 23 pounds (102 newtons) and 50 pounds (223 newtons). The results are shown at the bottom of Table 1.

Note that the Mooney viscosities of the rubber stocks in the rubber compounds A to D were measured at a temperature of 100° C. The value for the rubber stocks of the rubber compound C was 85, while it was a large 145 for the rubber stocks of the rubber compounds A and B. From this, it is learned that the rubber stocks of the rubber compounds A and B had a higher molecular weight than that of the rubber compound C.

As shown in Table 1, the rubber compounds A and B featured lower internally generated heat compared with the rubber compounds C and D. The reasons are believed to be that the rubber compounds A and B used the high molecular weight type hydrogenated nitrile rubber as the rubber stock and the large content of zinc methacrylate. In particular, comparing the rubber compounds B and C, it was learned that high molecular weight type hydrogenated nitrile rubber features a lower internally generated heat compared with the conventional hydrogenated nitrile rubber.

EXAMPLE 2

The permanent set for evaluating the degree of deformation of the rubber due to the test of Example 1 was measured in accordance with the Goodrich flexo test. Table 1 shows the percentage of deformation with respect to the original height of the cylinders after removal of the load. Small values indicate small degrees of deformation remaining after removal of the load.

EXAMPLE 3

To evaluate the bonding strength between the cords and the rubber stock, a comparison was made of the bonding in the case of formation of the cashew-modified phenol resin layer at the outermost layer of the cords and the case of no formation of the same. First, an explanation will be made of Test Specimen No. 1, Test Specimen No. 2, Comparative Test Specimen No. 1, and Comparative Test Specimen No. 2 used for the tests.

(1) Test Specimen No. 1

Three bundles of 200 high strength glass fibers of diameters of 7 μm (brandname: U-Glass, made by Japan Glass Fiber) were placed together and given a primary twist to make a strand. Eleven of these strands were placed together and given a secondary twist to obtain the cords. Table 2 shows the composition of the high strength glass fiber.

TABLE 2

| Composition of High Strength Glass Fiber | |
|---|---|
| Component | Content (%) |
| $SiO_2$ | 55 to 65 |
| $Al_2O_3$ | 20 to 26 |
| CaO | 0 to 10 |
| MgO | 7 to 12 |
| $R_2O$ (*) | 0 to 0.5 |
| $B_2O_3$ | 0 to 1 |

Note: The asterisk indicates a mixture of $Na_2O$ and $K_2O$.

The cords were immersed in an RFL solution comprised of butadiene-ethylene-vinylvinylidene-ter-polymer as the latex component plus chlorosulfonated polyethylene latex and then were dried to form an RFL layer on the cords. The cords were then given a primary twist in one direction, then a secondary twist in the other direction. They were then immersed in a rubber solution of chlorosulfonated polyethylene and then dried, thereby obtaining the cords with an overcoat layer.

The cords with this overcoat layer were then immersed in a 25 percent solution of cashew-modified phenol resin (brandname PR12687, made by Sumitomo Dulles (phonetic) in methylethylketone, then were dried, thereby forming the cashew-modified phenol resin layer on the outermost layer of the cords.

Figure 3:
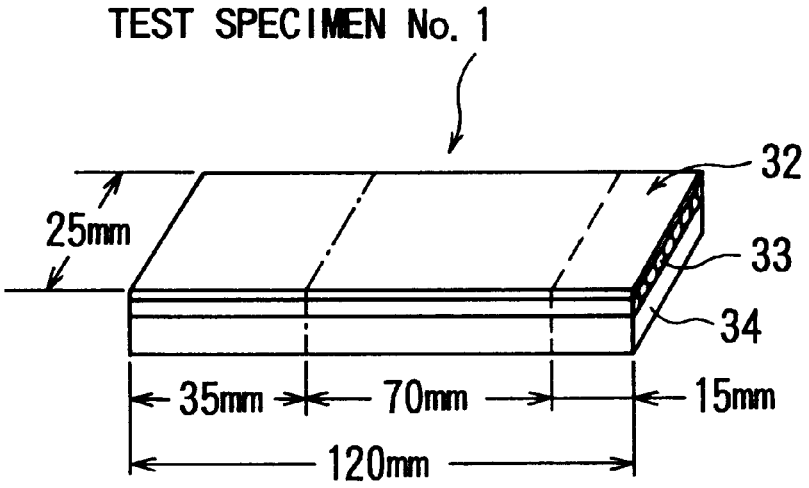
FIG. 3 is a perspective view of a test specimen used in the test for evaluating the bonding strength between the cords and rubber stock.

FIG. 3 is a perspective view of Test Specimen No. 1. Test Specimen No. 1 was prepared in the following way. First, a rubber sheet 34 of a width of 25 mm and length of 120 comprised of the rubber compound A was prepared. On this rubber sheet 34 were laid 28 cords of 120 mm length treated as above. On these cords was then placed a reinforcing fabric 32. These were then pressed by a hot press to obtain Test Specimen No. 1.

(2) Test Specimen No. 2

Aromatic polyamide fibers bundled to a thickness of 1500 de were given a twist in one direction to form a strand. Two of these strands were then placed together and given a secondary twist in the same direction to form the cord 33. The cord was immersed in an epoxy solution, then dried and then was immersed in an RFL solution and dried to form an RFL layer. Further, it was immersed in a rubber solution and then dried to form the overcoat layer on the cord 33. Next, the same technique as for Test Specimen No. 1 was used to form a cashew-modified phenol resin layer on the outermost layer of the cord 33. Thirty-two of the cords 33 with the cashew-modified phenol resin layer on the outermost layer were placed on the rubber sheet 34. The rest of the structure and treatment were the same as with Test Specimen No. 1.

(3) Comparative Test Specimen No. 1

Comparative Test Specimen No. 1 was prepared in the same way as Test Specimen No. 1 except that a cashew-modified phenol resin layer was not formed.

(4) Comparative Test Specimen No. 2

Comparative Test Specimen No. 2 was prepared in the same way as Test Specimen No. 2 except that a cashew-modified phenol resin layer was not formed.

Figure 4:
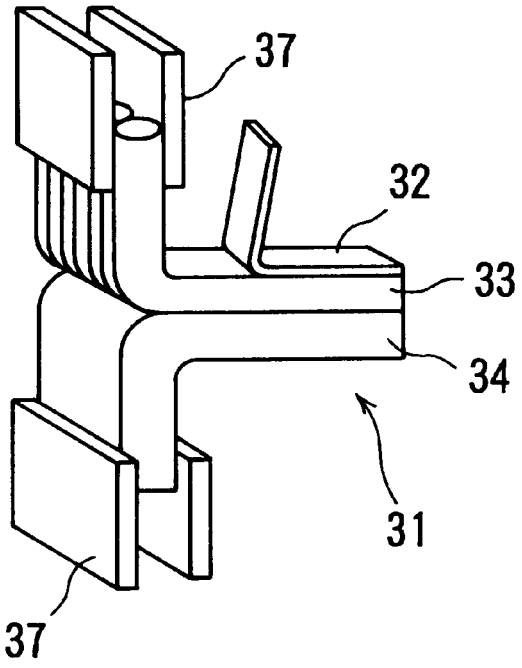
FIG. 4 is a view of the state of attachment of the test specimen of FIG. 3 to the test apparatus.

FIB. 4 shows the state of a test specimen 31 mounted on the test apparatus. The test method will be explained below with reference to FIG. 4. A cut was made at one end of the test specimen 31 between the cords 33 and the rubber compound 34 so that the surfaces of the cords 33 could be seen. The separated ends of the cords 33 and ends of the rubber compound 34 were attached to the chucks 37. Tension was applied at a speed of 50 mm/min by the tensile test apparatus. The bonding strength was evaluated by measuring the force required for peeling the cords 33 and the rubber compound 34 apart. The results of the test are shown in the bottom of Table 3.

TABLE 3

Bonding Strength of Test Specimens

| | TS No. 1 | TS No. 2 | Comp. TS No. 1 | Comp. TS No. 2 |
|---|---|---|---|---|
| Rubber compound A(1) | ○ | ○ | ○ | ○ |
| Cords | | | | |
| High strength glass fiber | ○ | | ○ | |
| Aromatic polyamide fiber | | ○ | | ○ |
| Treatment of cords | | | | |
| RFL layer + overcoat layer + cashew-modified phenol resin layer | ○ | ○ | | |
| RFL layer + overcoat layer | | | ○ | ○ |
| Bonding strength (kg) | 22.2 | 23.2 | 3.7 | 4.8 |

Note: Rubber compound A is same as rubber compound A of Table 1.

As shown in Table 3, the bonding strengths of the Comparative Test Specimen Nos. 1 and 2 were too low for practical use. The reasons for this are believed to be the high molecular weight of the high molecular weight type hydrogenated nitrile rubber and the content of zinc methacrylate in the high molecular weight type hydrogenated nitrile rubber.

As opposed to this, the Test Specimen Nos. 1 and 2 exhibited bonding strengths sufficient for practice use. The reasons for this are believed to be the presence of aromatic hydroxyl groups of a large polarity in the cashew-modified phenol resin and, also, the bonding of side chains of 15 carbon atoms and a small polarity, including double bonds, at the aromatic rings and the increase of the bonding strength by the action of this side chain portion.

EXAMPLE 4

To evaluate the bonding strength between the fabric and the rubber compound of the present invention, a comparison was made between the case where a cashew-modified phenol resin layer was formed on the surface of the fabric at the belt body side and the case where it was not formed. First, an explanation will be made of the structures of the Test Specimen No. 3, Comparative Test Specimen No. 3, and Comparative Test Specimen No. 4 used for this test.

(1) Test Specimen No. 3

For the warp of the fabric, used in the longitudinal direction of the belt, use was made of a core yarn of elastic urethane yarn of 420 de around which was wound in one direction a spun yarn of aromatic polyamide fiber (brandname: Technolar, made by Teijin) of 200 de (133 filaments) at a rate of 650 turns per meter and around which in turn was wound in the opposite direction crimping yarn of nylon, that is, an aliphatic polyamide fiber, of 100 de (34 filaments) at a rate of 850 turns per meter. For the weft, extending in the width direction of the belt, use was made of nylon filament yarn (34 filaments) of 100 de.

The fabric was comprised of 150 warps/5 cm in the longitudinal direction of the belt and 170 wefts/5 cm in the width direction of the belt. It was woven by the 2/2 twill weave method.

For bonding with the rubber compound, the fabric was immersed in an RFL solution comprising carboxyl nitrile rubber as the latex component plus 2,6-bis(2,4-dihydroxyphenylmethyl)-4-chlorophenol derivative polymer (brandname: Valcabond E, made by ICI-Vulnax), then dried to form an RFL layer on the surface of the fabric. On the outermost surface of this was then directly coated a 25 percent solution of cashew-modified phenol resin in methylethylketone to form the cashew-modified phenol resin layer.

A rubber sheet comprised of the rubber compound A and of a width of 25 mm and a length of 120 mm was prepared. On it was placed the above-mentioned fabric of a length of 120 mm. On the fabric, further, was placed a reinforcing fabric. This was pressed by a hot press to obtain the Test Specimen No. 3.

(2) Comparative Test Specimen No. 3

Comparative Test Specimen No. 3 was prepared in the same way as Test Specimen No. 3 except that a cashew-modified phenol resin layer was not formed.

(3) Comparative Test Specimen No. 4

Comparative Test Specimen No. 4 was prepared in the same way as Comparative Test Specimen No. 3 except that a chlorophenol derivative polymer was not added.

TABLE 4

Bonding Strength of Test Specimens

| | TS No. 3 | Comp. TS No. 3 | Comp. TS No. 4 |
|---|---|---|---|
| Rubber compound A | ○ | ○ | ○ |
| Cord (Note) | ○ | ○ | ○ |
| Treatment of fabric | | | |
| RFL layer (with chlorophenol derivative polymer added) + | ○ | | |
| RFL layer (with chlorophenol derivative polymer added) | | ○ | |

TABLE 4-continued

Bonding Strength of Test Specimens

| | TS No. 3 | Comp. TS No. 3 | Comp. TS No. 4 |
|---|---|---|---|
| RFL layer (with chlorophenol derivative polymer not added) | | | ○ |
| Bonding strength (kg) | 16.0 | 7.5 | 3.0 |

Note: The cord was comprised of 150 warps/25 mm of composite yarn of urethane elastic yarn of 420 de, aromatic polyamide fiber filament yarn of 200 de wound in S-direction at 650 T/m, and nylon 66 of 100 de wound in Z-direction at 850 T/m and 170 wefts/25 mm of nylon 66 of 100 de in a 2/2 twill weave.

As shown in Table 4, the bonding strength exhibited by Comparative Test Specimen No. 3 and 4 was too small for practical use. As opposed to this, Test Specimen No. 3 exhibited a bonding strength sufficient for practical use. The reason is believed to be, like with Example 3, the large action of the side chain portion of the cashew-modified phenol resin.

EXAMPLE 5

Next, a comparison was made of the service life of power transmission belts using Belt Nos. 1 to 3 and Comparative Belt Nos. 1 to 4. Table 5 shows the structure of the power transmission belts used for this.

TABLE 5

Results of Test of Belts

| | Belt No. | | | Compararive Belt No. | | | |
|---|---|---|---|---|---|---|---|
| | 1 | 2 | 3 | 1 | 2 | 3 | 4 |
| Rubber compound (1) | A | B | A | C | C | D | D |
| Fabric | | | | | | | |
| 1 | ○ | ○ | ○ | ○ | | | |
| 2 | | | | | ○ | ○ | ○ |
| Cords | | | | | | | |
| High strength glass fiber | ○ | ○ | | ○ | ○ | ○ | |
| Aromatic polyamide fiber | | | ○ | | | | ○ |
| Load | | | | | | | |
| 11.5 kg (2) | 1531 | 1365 | 1524 | 1113 | 684 | 430 | 426 |
| 15.3 kg (2) | 572 | 514 | 568 | 412 | 226 | 124 | 118 |

Notes:
(1) Rubber compounds A to D correspond to the rubber compounds A to D of Table 1.
(2) The loads are loads on a tooth in the case of a belt width of 19.1 mm.
(3) Figures in the load rows shows the number of hours until the tooth broke off.

(1) Belt No. 1

The fabric of Test Specimen No. 3 was used for the fabric. The cords of Test Specimen No. 1 were used for the cords.

The method of manufacture of Belt No. 1 will be explained below. First, the fabric was wound in the outer circumferential direction of a die so that its stretching direction was in the circumferential direction of the die, that is, so that it would follow the direction of the grooves of the tooth portion. The cords were wound on top of the fabric and then a rubber sheet comprised of the rubber compound A was wound on the cords. The thus prepared die was placed in an oven and heated under pressure, whereby the rubber flowed to spread over the fabric. The belt tooth portion was formed by vulcanization. After the vulcanization, the die was removed and a cylindrical belt slab was obtained. This belt slab was cut to obtain Belt No. 1 of a width of 19.1 mm.

(2) Belt No. 2

Belt No. 2 was prepared in the same way as Belt No. 1 except that use was made of the rubber compound B.

(3) Belt No. 3

Belt No. 3 was prepared in the same way as Belt No. 1 except that use was made of the cord used for Test Specimen No. 2.

(4) Comparative Belt No. 1

Comparative Belt No. 1 was prepared in the same way as Belt No. 1 except that use was made of the rubber compound B.

(5) Comparative Belt No. 2

In the fabric used in Comparative Belt No. 2, for the warp, use was made of 85 yarns/25 mm of aliphatic polyamide fiber, i.e., nylon crimping yarn of 420 de (204 filaments) in the longitudinal direction of the belt. For the weft in the width direction of the belt, use was made of 85 yarns/25 mm of nonstretch yarn of 210 de (35 filaments). The method of weaving was 2/2 twill weave. An RFL layer was formed on the fabric. The rest of the configuration and processing were the same as in Comparative Belt No. 1.

(6) Comparative Belt No. 3

Comparative Belt No. 3 was prepared in the same way as Comparative Belt No. 2 except that use was made of the rubber compound D.

(7) Comparative Belt No. 4

Comparative Belt No. 4 was prepared in the same way as Comparative Belt No. 3 except that use was made of the cords used for Test Specimen No. 2.

A running test was performed on the Belt Nos. 1 to 3 and Comparative Belt Nos. 1 to 4 prepared above under conditions of a temperature of 100° C. and a speed of 5500 rpm. The service life of the power transmission belts was evaluated by the number of hours until the teeth broke off. The test results are shown in the bottom of Table 5. As shown in Table 5, Belt Nos. 1 to 3 had longer service lives than Comparative Belt Nos. 1 to 4. The reasons were that Belt Nos. 1 to 3 used high molecular weight type hydrogenated nitrile rubber as a rubber stock and, further, the cords of Belt Nos. 1 to 3 were coated with a cashew-modified phenol resin layer.

EXAMPLE 6

Figure 5:
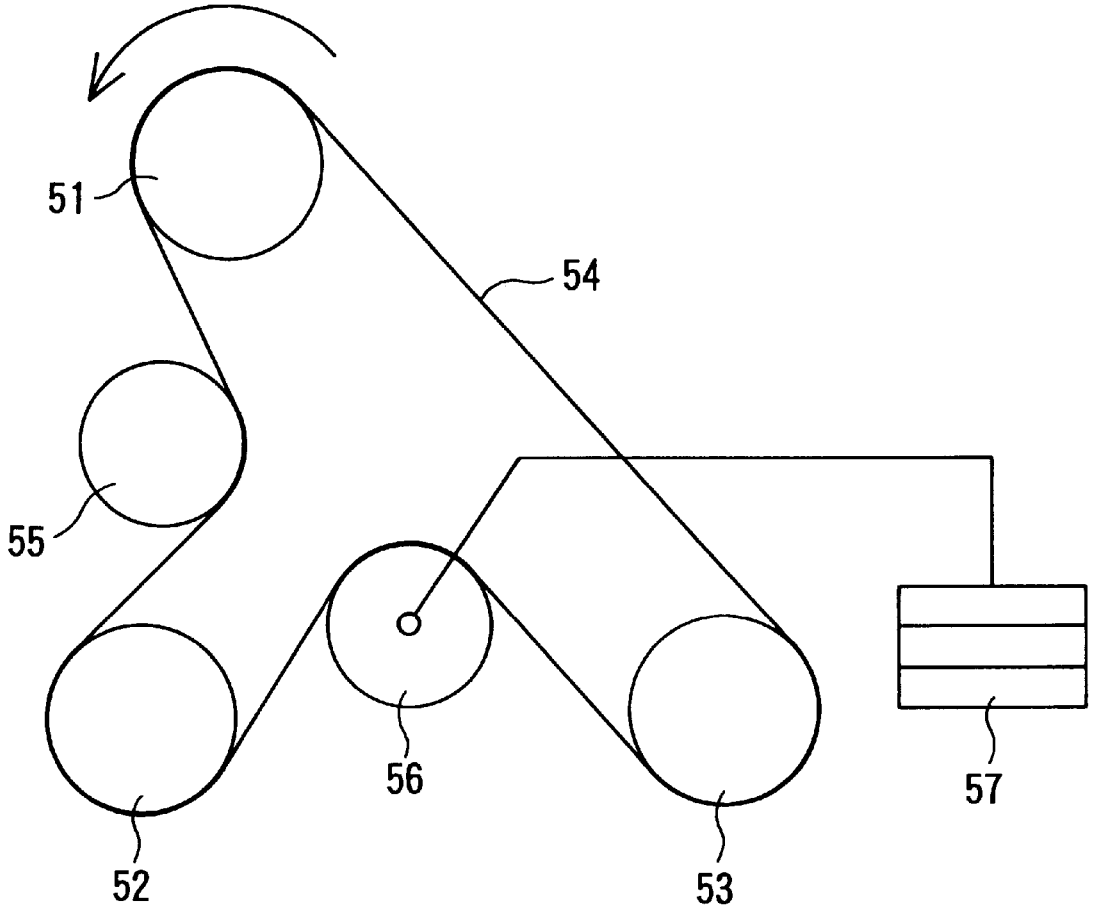
FIG. 5 is a view of the test apparatus for the High temperature surpentive drive test.

Next, a multi-flexural test for a power transmission belt was performed using Belt No. 1 and Comparative Belt Nos. 1 and 3. The test apparatus, as shown in FIG. 5, was comprised of three pulleys 51, 52, and 53 around which the belt 54 was wrapped. It was further provided with an idler pulley between the pulleys 51 and 52 and provided with a tensioner 56 between the pulleys 52 and 53. The tensioner 56 was provided with a biasing means such as a weight 57. This enabled a certain tension to be imparted to the belt 54. The results of the test are shown in Table 6.

TABLE 6

Results of Multi-flexural Test

| | Belt No. 1 | Comp. Belt No. 1 | Comp. Belt No. 2 |
|---|---|---|---|
| Rubber compound | A | C | D |
| Fabric | | | |
| 1 | ○ | ○ | |
| 2 | | | ○ |
| High strength glass fiber cord | ○ | ○ | ○ |
| Multi-flexural test (hours) | 2700 | 1800 | 1100 |

Notes
(1) The rubber compounds correspond to the rubber compounds A to D of Table 1.
(2) The fabric 1 is comprised of covering yarn and the fabric 2 is comprised of nylon crimped yarn.
(3) The multi-flexural test was performed by the apparatus shown in FIG. 5. The rotational speed was 6000 rpm and the ambient temperature 100° C. The evaluation was made by comparing the time until the strength of the belt fell to 1/3 that of the time before running.

As shown in Table 6, according to Belt No. 1, the endurance time in a multi-flexural test is much more improved compared with Comparative Belt Nos. 1 and 3.

Note that the power transmission belt of the present invention may be also applied to a double-sided belt having tooth portions on its two surfaces.

Figure 6:
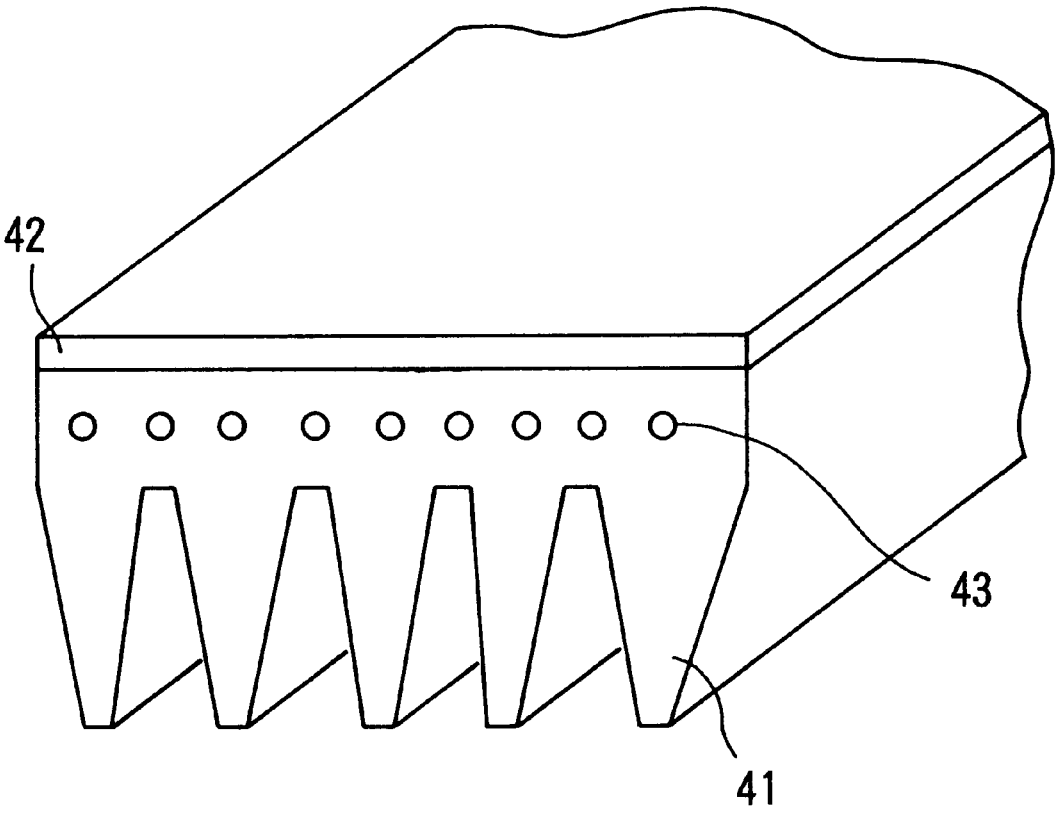
FIG. 6 is a perspective view of another example of the power transmission belt of the present invention.

Further, the power transmission belt of the present invention can be applied to the V-belt shown in FIG. 6. This V-belt has a tooth portion 41 extending in its longitudinal direction and a fabric 42 and cords 43 provided at its back surface.

Further, when there is a joint of the fabric, the joint is preferably located on a belt tooth. This is so that when the belt tooth meshes to the pulley teeth, no large force will be received from the pulley, because a top of the belt fits to a bottom of the pulley.

Note that the number of carbon atoms in the side chain in the phenol resin may for example be nine as in the case of a nonyl phenol resin.

While the invention has been described by reference to specific embodiments chosen for purposes of illustration, it should be apparent that numerous modifications could be made thereto by those skilled in the art without departing from the basic concept and scope of the invention.

We claim:

[1. A power transmission belt provided with a belt body formed using a rubber stock a hydrogenated nitrile rubber having a Mooney viscosity at 100° C. of at least 90 and cords embedded in the belt body extending in the longitudinal direction of the belt body and having at their outermost layer a layer of phenol resin modified by a phenol having side chains with unsaturated bonds and a component including a phenyl carboxylic acid and a predetermined compound.]

[2. A power transmission belt as set forth in claim 1, wherein the Mooney viscosity is about 145.]

[3. A power transmission belt as set forth in claim 1, wherein the belt body is vulcanized by a peroxide or sulfur.]

[4. A power transmission belt as set forth in claim 3, wherein a covulcanizing agent used for the vulcanization includes zinc methacrylate and trimethylolpropane-trimethacrylate.]

[5. A power transmission belt as set forth in claim 1, wherein the cords are formed by a high strength glass fiber or aromatic polyamide fiber.]

[6. A power transmission belt as set forth in claim 1, wherein a resorcine-formaldehyde-latex layer is formed on the cords and an overcoat layer is formed over the outer circumference of the same.]

[7. A power transmission belt as set forth in claim 1, wherein a tooth portion is formed at least at one surface of the belt body and the surface of the tooth portion is covered by fabric.]

[8. A power transmission belt as set forth in claim 7, wherein a modified phenol resin layer is formed at the surface of the belt body side of the fabric.]

[9. A power transmission belt as set forth in claim 7, wherein a resorcine-formaldehyde-latex layer is formed at the surface of the fabric.]

[10. A power transmission belt as set forth in claim 7, wherein the fabric is comprised by composite yarn provided along the longitudinal direction of the belt and yarn provided along the width direction of the belt.]

[11. A power transmission belt as set forth in claim 10, wherein the composite yarn is provided with a core yarn of an elastic yarn of a polyurethane yarn, a spun yarn wrapped around the core yarn, and a crimping yarn wrapped at the outside of the spun yarn.]

[12. A power transmission belt as set forth in claim 1, wherein the modified phenol resin layer is comprised by a naturally produced phenol resin.]

[13. A power transmission belt as set forth in claim 1, wherein the-modified phenol resin layer is comprised by a modified phenol resin including cashew nut shell liquid.]

[14. A power transmission belt as set forth in claim 1, wherein the modified phenol resin layer is comprised by a Japanese lacquer-modified phenol resin.]

[15. A power transmission belt as set forth in claim 1, wherein the modified phenol resin layer is comprised by a phenol resin modified by urushiol, which is the main ingredient of Japanese lacquer.]

[16. A power transmission belt as set forth in claim 1, wherein the modified phenol resin layer is comprised by a phenol resin modified by laccol, which is the main ingredient of tsuta lacquer.]

[17. A power transmission belt as set forth in claim 1, wherein the modified phenol resin layer is comprised by a phenol resin modified by thitsiol, which is the main ingredient of Burmese lacquer.]

[18. A power transmission belt as set forth in claim 1, wherein the modified phenol resin layer is comprised by a phenol resin modified by moreacol, which is the main ingredient of Cambodian lacquer.]

[19. A power transmission belt as set forth in claim 1 wherein the modified phenol resin layer is comprised by a bhilawan shell liquid-modified phenol resin.]

[20. A power transmission belt as set forth in claim 1, wherein the modified phenol resin layer is comprised by a phenol resin modified by bhilawanol, which is one component of bhilawan shell liquid.]

[21. A power transmission belt as set forth in claim 1, wherein the modified phenol resin layer is comprised by a phenol resin modified by a compound introduced at an aromatic ring having a phenolic hydroxyl group.]

[22. A power transmission belt as set forth in claim 1, wherein the modified phenol resin layer is comprised by a phenol resin modified by oiticca oil.]

[23. A power transmission belt as set forth in claim 1, wherein the modified phenol resin layer is comprised by a phenol resin modified by an additional reaction of tung oil and catechol.]

*24. A cord comprising: an outermost layer of phenol resin modified by one of a phenol having side chains with unsaturated bonds, and a component including a phenol carboxylic acid.*

*25. A cord as set forth in claim 24, wherein said cord is embedded in a belt body of a power transmission belt, said belt being formed using a rubber stock of a hydrogenated nitrile rubber having a Mooney viscosity at 100° C. of at least 90.*

*26. A cord as set forth in claim 25, wherein said Mooney viscosity is about 145.*

*27. A cord as set forth in claim 25, wherein said cord is formed by at least one of a high strength glass fiber and a aromatic polyamide fiber.*

*28. A cord as set forth in claim 25, wherein a resorcine-formaldehyde-latex layer is formed on said cord and an overcoat layer is formed over the outer circumference of the same.*

*29. A cord as set forth in claim 24, wherein the modified phenol resin layer is comprised by a naturally produced phenol resin.*

*30. A cord as set forth in claim 24, wherein the modified phenol resin layer is comprised by a modified phenol resin including cashew nut shell liquid.*

*31. A cord as set forth in claim 24, wherein the modified phenol resin layer is comprised by a Japanese lacquer-modified phenol resin.*

*32. A cord as set forth in claim 24, wherein the modified phenol resin layer is comprised by a phenol resin modified by urushiol, which is the main ingredient of Japanese liquor.*

*33. A cord as set forth in claim 24, wherein the modified phenol resin layer is comprised by a phenol resin modified by laccol, which is the main ingredient of tsuta lacquer.*

*34. A cord as set forth in claim 24, wherein the modified phenol resin layer is comprised by a phenol resin modified by thitsiol, which is the main ingredient of Burmese lacquer.*

*35. A cord as set forth in claim 24, wherein the modified phenol resin layer is comprised by a phenol resin modified by moreacol, which is the main ingredient of Cambodian lacquer.*

*36. A cord as set forth in claim 24, wherein the modified phenol resin layer is comprised by a bhilawan shell liquid-modified phenol resin.*

*37. A cord as set forth in claim 24, wherein the modified phenol resin layer is comprised by a phenol resin modified by bhilawanol, which is one component of bhilawan shell liquid.*

*38. A cord as set forth in claim 24, wherein the modified phenol resin layer is comprised by a phenol resin modified by a compounds introduced at an aromatic ring having a phenolic hydroxyl group.*

*39. A cord as set forth in claim 24, wherein the modified phenol resin layer is comprised by a phenol resin modified by oiticca oil.*

*40. A cord as set forth in claim 24, wherein the modified phenol resin layer is comprised by a phenol resin modified by an additional reaction of tung oil and catechol.*

*41. A fabric comprised by a fiber comprising: an outermost layer of phenol resin modified by one of a phenol having side chains with unsaturated bonds, and a component including a phenol carboxylic acid.*

*42. A fabric as set forth in claim 41, wherein said fabric is provided on a belt body of a power transmission belt in such a manner that said layer is adhered on a surface of said belt body, said belt body being formed using as a rubber stock of a hydrogenated nitrile rubber having a Mooney viscosity at 100° C. of at least 90.*

*43. A fabric as set forth in claim 42, wherein the Mooney viscosity is about 145.*

*44. A fabric as set forth in claim 42, wherein a tooth portion is formed at said surface of said belt body.*

*45. A fabric as set forth in claim 41, wherein a resorcine-formaldehyde-latex layer is formed at the surface of said fabric.*

*46. A fabric as set forth in claim 41, wherein said fabric is comprised by composite yarn provided along the longitudinal direction of the belt and yarn provided along the width direction of the belt.*

*47. A fabric as set forth in claim 46, wherein the composite yarn is provided with a core yarn of an elastic yarn of a polyurethane yarn, a spun yarn wrapped around the core yarn, and a crimping yarn wrapped at the outside of the spun yarn.*

*48. A fabric as set forth in claim 41, wherein the modified phenol resin layer is comprised by a naturally produced phenol resin.*

*49. A fabric as set forth in claim 41, wherein the modified phenol resin layer is comprised by a modified phenol resin including cashew nut shell liquid.*

*50. A fabric as set forth in claim 41, wherein the modified phenol resin layer is comprised by a Japanese lacquer-modified phenol resin.*

*51. A fabric as set forth in claim 41, wherein the modified phenol resin layer is comprised by a phenol resin modified by urushiol, which is the main ingredient of Japanese lacquer.*

*52. A fabric as set forth in claim 41, wherein the modified phenol resin layer is comprised by a phenol resin modified by laccol, which is the main ingredient of tsuta lacquer.*

*53. A fabric as set forth in claim 41, wherein the modified phenol resin layer is comprised by a phenol resin modified by thitsiol, which is the main ingredient of Burmese lacquer.*

*54. A fabric as set forth in claim 41, wherein the modified phenol resin layer is comprised by a phenol resin modified by moreacol, which is the main ingredient of Cambodian lacquer.*

*55. A fabric as set forth in claim 41, wherein the modified phenol resin layer is comprised by a bhilawan shell liquid-modified phenol resin.*

*56. A fabric as set forth in claim 41, wherein the modified phenol resin layer is comprised by a phenol resin modified by bhilawanol, which is one component of bhilawan shell liquid.*

*57. A fabric as set forth in claim 41, wherein the modified phenol resin layer is comprised by a phenol resin modified by a compound introduced at an aromatic ring having a phenolic hydroxyl group.*

*58. A fabric as set forth in claim 41, wherein the modified phenol resin layer is comprised by a phenol resin modified by oiticca oil.*

*59. A fabric as set forth in claim 41, wherein the modified phenol resin layer is comprised by a phenol resin modified by an additional reaction of tung oil and catechol.*

* * * * *